117,184

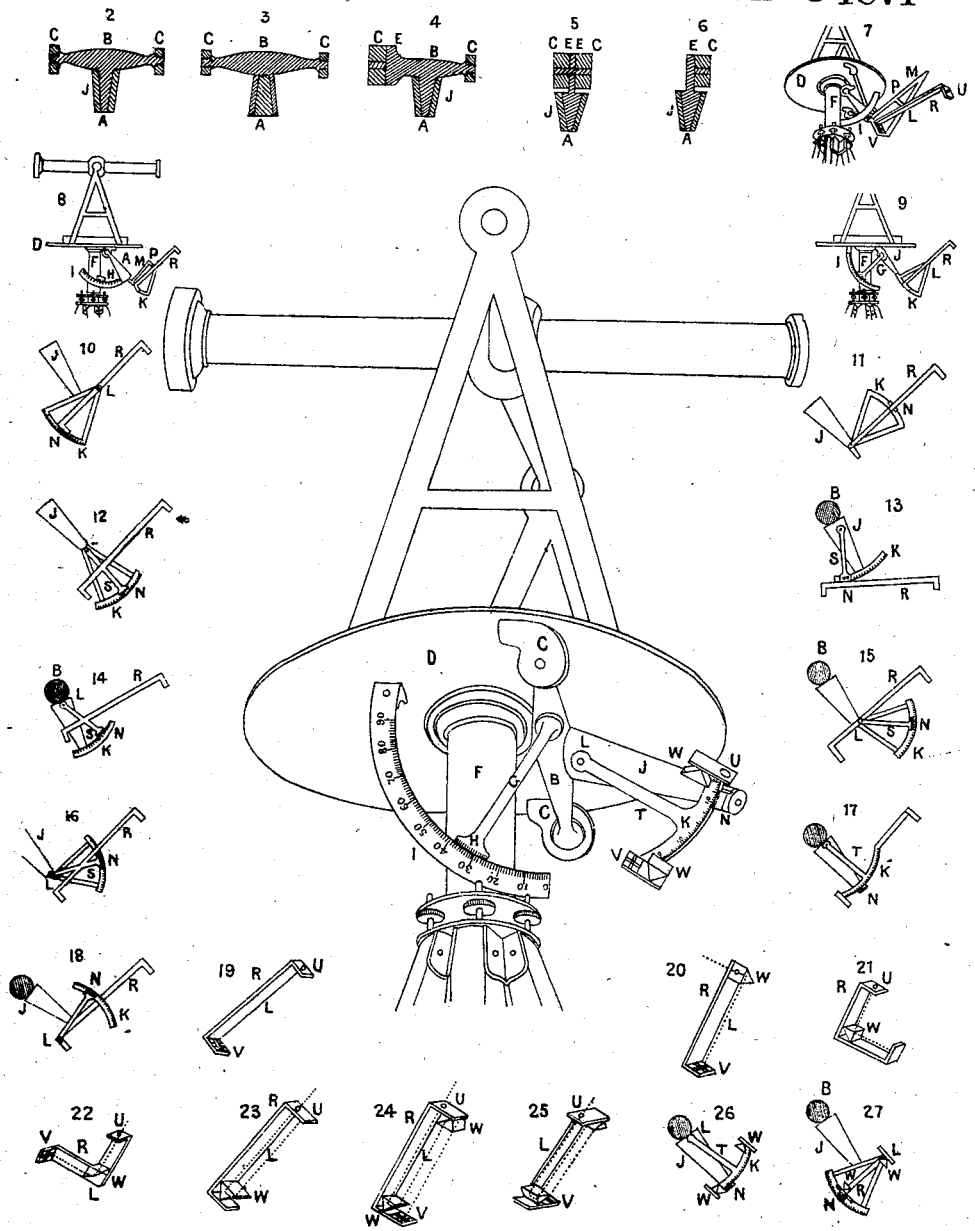

UNITED STATES PATENT OFFICE.

BENJAMIN SMITH LYMAN, OF PHILADELPHIA, PENNSYLVANIA.

IMPROVEMENT IN SOLAR COMPASSES.

Specification forming part of Letters Patent No. 117,184, dated July 18, 1871.

*To all whom it may concern:*

Be it known that I, BENJAMIN SMITH LYMAN, of No. 135 South Fifth street, in the city and county of Philadelphia and State of Pennsylvania, but staying for the time being in Calcutta, India, have invented certain Improvements in Solar Compasses, of which the following is a specification:

The solar compass is so made as to point out the true north and south by means of the sun, without the need of the magnetic needle. In order to see how this is done, in spite of the constant changes in the direction of the sun from any place, the nature of those changes must be looked at closely and the general plan of solar compasses considered. The most striking change in the direction of the sun comes from its apparent motion once in every day round the earth's polar-axis. This is like the daily apparent motion of the stars, but so much slower that in a year the sun makes a complete circuit of the heavens. The daily motion of the stars, moreover, is at right angles with the earth's polar-axis or parallel to the equator, while the sun is at the same time moving either toward the equator or away from it within a certain limit (23° 27' 30'') north and south of it every year. The northern limit is reached at the solstice in June and the southern at the solstice in December; and the sun crosses the equator northward at the equinox in March and southward at the equinox in September; and in one year, or $365\tfrac{31}{128}$ days, the sun returns to the same apparent place. The sun's distance north or south of the equator at any time is called the sun's declination, and its yearly path among the stars is called the ecliptic.

A solar compass, then, must in some way imitate these daily and yearly motions of the sun, so that when a certain part of the instrument shall be pointed toward the sun at any time in the day a certain other part shall be pointed due north and south. The part to be pointed toward the sun is called the solar-bar or lens-bar, and bears at one end a small lens and at the other a silver plate marked with a pair of lines, (called the equatorial lines,) between which the image of the sun should fall. This bar is so joined to an axis (called the polar-axis or day-axis) as to turn freely about it, and is inclined toward an equatorial plane of that axis by an angle equal to the sun's declination for any given day or hour. The polar-axis is placed at the same angle with the horizon as the earth's polar-axis—that is, the latitude of the place where the instrument is used—and for this purpose is joined to a nicely-leveled plate in such a way that it can be put at any needed angle with it, but moves in one plane only—a plane perpendicular to the plate, or vertical. With the lens-bar set to the sun's declination and the polar-axis to the latitude of the place the sun can shine through the lens and form its image between the lines of the silver plate only when the north and south lines of the leveled plate have been turned so as to be in the true meridian, and make the polar-axis of the instrument parallel to the polar-axis of the earth. The motion of the lens-bar round the polar-axis answers to the daily motion of the sun, and changes the direction of the bar from hour to hour. In using the instrument the refraction of the atmosphere must also be taken into account, for that makes the sun seem higher in the sky than it really is, so that the amount of refraction made known by tables or formulas for each height and state of the air must be added to the inclination of the lens-bar with reference to the polar-axis.

In the best form of the solar compass hitherto, (Burt's,) the solar apparatus is placed on the large horizontal plate that bears the levels and verniers, and another plate close below it bears the horizontal graduation and the sights. Each plate turns independently of the other about a common vertical center, and the upper plate can be clamped to the center and remain fixed in the same meridian, while the lower plate may be turned about. Instead of using the common compass-sights a telescope on a short upright support may be put upon the plate near the place of one of the sights; but the telescope must be a small one, or it will be in the way of the solar apparatus, besides making this end of the plate too heavy; and it is best, at any rate, to keep the balance by a weight at the other end of the plate. This adds to the weight of the instrument, and even then the solar apparatus is rather in the way of the telescope or its line of sight, and the purposes of the telescope of an engineer's transit are not fully answered. It has long been wished to combine the advantages of the transit and solar compass, and there have been several devices to that end. A telescope has been hung between very long and crooked supports, so high as to be above the solar apparatus; but the disadvantages of such an arrangement are very clear. The telescope of a transit supported in the ordinary way has also been made to serve for setting off the latitude-arc by means of the vertical circle commonly joined to such a telescope, and the declination-arc and solar-bar have been placed on top of the telescope. Besides the inconvenience of having to set off the latitude afresh for every observation—although the latitude may be sensibly the same throughout a whole day or even longer—there is the far more serious disadvantage that the solar apparatus, on which the precision of the whole instrument depends, is in the very place where it is the most exposed of all to serious disturbance of the adjustments by knocks or blows upon itself, or upon the telescope, or upon the high vees that bear the telescope.

The invention for which a patent is asked is mainly a combination of the transit and solar compass, or a solar transit in which the disadvantages and inconveniences just mentioned, as well as others, are fully met. The solar apparatus is put on the under side of the main or graduated plate of a transit, so that all the space above is left clear for the plate that bears the telescope-vees and vernier and the magnetic compass commonly added for convenience. The solar apparatus is also joined so firmly and closely to its plate, and in so sheltered a place, that it is as free as can be from all danger of getting knocked out of adjustment, and in the details there are several improvements upon the solar compasses hitherto used. Of course, the same solar apparatus could in like manner be put on the bottom of a compass, or theodolite, or plane-table, or other surveying instruments, or on an upper plate when there is room. The polar or day-axis A is fastened at the northern end to a horizontal axis, called the latitude-axis B, at right angles with it, that turns with bearings at the two ends in small blocks C, fixed on the under side of the main plate D. These bearings may be far apart, near the edge of the plate, Figs. 2 and 3, or near together, Figs. 4 to 6. In this latter case the steadiness of the motion in one plane must be maintained by a broad shoulder, E, upon the axis, that fits closely upon a similar shoulder on the block at one of the bearings, Fig. 4; or there may be such shoulders at both bearings, and these may be brought close together, Fig. 5, and, indeed, there need then be but one bearing, Fig. 6. But the best way is to have two bearings as wide apart as possible, which will be some five or six inches in a transit of ordinary size, and the latitude-axis will pass about one inch, say from the vertical support F of the plates of the instrument alongside of the main center. An arm, G, is fixed to the latitude-axis in a convenient place on one side of the main center of the instrument, and at right angles, say, with the polar-axis. At the end of this arm, two inches and a half, say, from the center of the latitude-axis, is a vernier, H, by which the latitude is read to one minute upon an arc, I, of ninety degrees, or less, that is fastened above to the bottom of the main plate, and near its lower end to the side of the vertical support of that plate. When the polar-axis hangs down vertically this vernier will mark ninety degrees at the upper end of the latitude-arc, and so point out the latitude of the pole. In like manner when the polar-axis is level the vernier will mark zero at the lower end of the latitude-arc—that is, the latitude of the equator—and so for any latitude between the two. Of course, a clamp and tangent-screw may be attached to the latitude-arc and vernier, if desired. The polar-axis is smoothly turned, of a conical shape, and may be about two inches long. Upon it fits nicely, Fig. 2, a hollow conical tube, J, that turns smoothly and truly upon it. The polar-axis, however, instead of being fixed with a cone turning upon it, may be made, Fig. 3, so as itself to turn inside of a cone fixed to the horizontal latitude-axis. The lower or outer end of this cone may then be braced by arms reaching from it to the ends of the latitude-axis near the blocks or bearings. Indeed, the whole of that axis, except these bearings, may then be taken away, so as to leave the cone and polar-axis supported only by these braces, much as is the case with the polar-axis of Burt's compass; or besides the two bearings for these braces, the upper or inner end of the cone outside of the polar-axis might be held to the plate by a third bearing, Fig. 7. The latitude-arc may then be put alongside of the polar-axis with its vernier joined to that axis, which would then need to be at least two inches and a half long, so as to read to minutes on a latitude-arc of that radius, and to bring the declination apparatus outside of that arc. The latitude-arc might also be fixed to the outer end of the cone around the polar-axis, and be read by a vernier joined to the main center of the instrument, past which the latitude-arc would slide in a groove, Fig. 8. But the first-mentioned way of supporting the polar-axis, by joining it without braces to the latitude-axis, is the simplest and best, and admits of more convenient arrangements of the declination-arc and solar-bar than the other.

The apparatus for marking the declination may have several forms, and may be joined to the polar-axis in several ways. The declination-arc K may be so placed that its zero-line—that is, the line joining its zero-point to the center of curvature or declination-axis L—shall be at right angles with the polar-axis, as in Burt's compass; or the arc may be so placed that the zero-line shall be parallel to the polar-axis; or the arc may be so arranged as to slide past a fixed vernier. At the lower or outer end of the part of the polar-axis that turns about its center line may be fixed a bar, Fig. 7, M, at right angles with the axis, and therefore turning in an equatorial plane; and this bar may have at one end an arc, K, of forty-seven degrees, for declination north and south. The arc should be in the same plane with the polar-axis, or in one parallel thereto, and should have a radius of two inches and a half at least, so as to read to minutes with a vernier, N. The arc may be held in place by a bar, O, running from near the outer end of the arc, through the center of curvature L of the arc, to the further end of the main bar M, which would then be five inches or more long; and there should then be a cross-piece, P, from one bar to the other at that center or axis; or both bars may stop at this cross-piece in approaching each other, Fig. 8, saving something in bulk without losing in strength; or both arms may meet at the center of curvature of the arc without changing the position of the arc with reference to the polar-axis, Fig. 9, a still further saving in bulk without loss of strength. It is only needful that the zero-line (through the middle of the arc) should be at right angles with the polar-axis. At the center of curvature of the arc is a bearing, the declination-axis L on which turns, in the plane of the arc, the lens-bar R, one end of it reaching to the arc and bearing a vernier, N. The declination-arc may be joined to the polar-axis either at one end of the arc, Figs. 7 to 9, or at some point on its arms, Fig. 10, or at the declination-axis, Fig. 11. In this last case the vernier N may be put on the lens-bar somewhere between its two ends and the bar be made to turn about a point near one of its ends, for a long lens-bar joined by its middle to the declination at the end of the polar-axis would be apt in high latitudes to hit the main center of the instrument in its daily turn round the polar-axis. The declination-axis may be fixed to the outer end of the turning part of the polar-axis, whether the outer or the inner cone, in such a way that the zero-line shall be in line with the polar-axis or parallel to it, Fig. 12. An arm, S, from the declination-axis, will then bear the vernier to mark the declination, and the lens-bar will be fixed to the vernier-arm at any convenient point between the two ends of either and at right angles with that arm. When the vernier is at zero the lens-bar will be parallel to the equator. When it is the inner cone of the polar-axis that is fixed to the latitude-axis the declination-axis may be put near the latitude-axis on the side of the hollow cone that turns on the polar-axis, Fig. 13, and the arc may then be fixed to the outer end of the same cone. The declination will then be set off by a vernier at the end of an arm from the declination-axis, and the lens-bar will be fixed to this vernier-arm in the way just pointed out. With the help of such a vernier-arm the zero-line of the declination-arc may be put at any angle with the polar-axis, Figs. 14 to 16, for the lens-bar would be fixed to the vernier-arm at an angle such that it would still be parallel to the equator when the vernier reads zero. But the simplest and the best way is to have, Fig. 17, the declination-arc joined to its axis (best quite near to the latitude-axis) by T— a single arm—(more may be used,) and to have the arc turn by that means about its axis, while the declination is read by a vernier fixed to the outer cone of the polar-axis. Then the lens-bar will be fixed to the declination-arc; indeed, this arc will be a part of it, say one end of it. The declination-axis may be put upon a vernier-arm fixed to the turning part of the polar-axis, say at right angles with it and its outer end, and then the lens-bar will best be made up in part of the arm that joins the declination-arc to the declination-axis, Fig. 18. The lens-bar R may be six inches long, as in Burt's solar compass, and a solar-lens of less length than that is not suitable, because the sun's image would be too small to show with proper precision—that is, within a minute of arc —whether it was rightly within the lines on the silver plate. The bar turns on the declination-axis so as to sweep over the declination-arc, and is joined to that axis either directly in any part of the length of the bar or indirectly by means of a vernier-arm or other intermediate piece or pieces. Each end of the bar, Fig. 19, bears a small plate at right angles with the bar. In one plate is a small lens, U, of, say a quarter of an inch diameter and six inches focal length, which forms upon a plate of silver, V, or other suitable material, say a quarter of an inch square, on the plate at the other end of the bar, an image of the sun. This silver plate bears two lines (called equatorial-lines) parallel to the equatorial plane, as far apart as the opposite edges of the sun's image, and two lines (called hour-lines) that cross these at right angles parallel to the plane of the declination-arc, and just inclosing the sun's image when the axis of the rays that form it is parallel to the length of the bar. The six-inch solar-bar, if hung at one end, would in many positions be much in the way and exposed to knocks. On the other hand, if hung in the middle it would come at noon in the way of the main center of the instrument. But the bar may, Fig. 20, be put at right angles with its common position of pointing lengthwise toward the sun, if a three-sided right-angled prism, W, say a quarter of an inch thick and half an inch long on the long face, be put at the lens end of the bar, so that the sun enters by one of the smaller faces, strikes at an angle of forty-five degrees upon the broad face, and is totally reflected through the other face at right angles with its real direction. In this way the bar hung in the middle, in making its daily turn around the polar-axis, would go in any latitude as far as, say nearly six o'clock, or six hours from the meridian, before the end of the bar would touch the main center of the instrument. The prism may likewise be placed midway between the lens and silver plate; and then the bar, instead of being straight, will form a right angle in the middle, and one-half of it may serve as a vernier-arm to the declination-arc, Figs. 21, 22. But the solar-bar may be shortened one-half by putting at the end opposite to the lens such a prism with its long side toward the lens, Fig. 23. The rays will then enter the prism with their axis at right angles with this face, strike one of the opposite faces at an angle of forty-five degrees, be totally reflected to the other face, strike that at the same angle and be totally reflected again, issue from the front of the prism, at right angles with it and parallel to the course at entering, and finally come to a focus upon a silver plate placed by the side of the lens. This would bring the length of the bar down from six inches to about three. It would also put the image of the sun in a troublesome place to see at noon, on the lower side of the plate that bears the lens;

but the equatorial and hour-lines might then be drawn on ground glass or other half-transparent material instead of on silver, so that they could be seen from above. But the rays, after the double reflection of this prism, and passing back to the end of the bar where the lens is, might, Figs. 24 and 25, be made to enter a second prism, X, of like size, and be again doubly reflected in the same way as before, to a silver plate at the side of the first prism. This would bring the solar-bar, with a six-inch lens, down to a length of two inches. Of course, instead of prisms plane mirrors might be used. The two-inch solar-bar would be far the most convenient one of all. It might just make up the length of the declination-arc, sliding past a vernier at the end of the polar-axis, Fig. 26, and the outer end of the polar-axis might bear a tangent-screw working into a ball at either end of the declination-arc, so as to set the declination with ease; or the solar-bar might be joined to the axis of a declination-arc whose zero-line is at right angles with the polar-axis, Fig. 27.

Besides the variations in the declination apparatus that have been already mentioned there might be a lens and silver plate at each end of a solar-bar hung in the middle, as in Burt's compass; and then there would need to be a declination-arc of only twenty-three and a half degrees, for the bar would then be turned end for end in winter from what it would be in summer for the same declination. But it is better to use the full declination-arc of forty-seven degrees and a two-inch solar-bar, for that arrangement would be a simpler one and need fewer adjustments, and would be a small loss in respect of bulk and weight.

The hour of the day may be marked by means of a graduation of fifteen degrees to each hour, or a quarter of a degree to each minute, upon a ring (best quite a small one) joined either to the fixed or to the turning part of the polar-axis. A vernier or simple index should be set upon the other part for reading the time, and would be called the hour-vernier or index. The time should be read, of course, when the sun's image is between the hour-lines, and will be apparent time, and will have to be corrected by the equation of time to get the mean time. The refraction will also change somewhat the time at which the sun will come between the hour-lines set to a given angle when not on the meridian, but that can be allowed for, if desired, by the help of tables.

The adjustments of the instruments are essentially the same as in other solar compasses and transits or theodolites, and need no particular description here, since they are all well known to instrument-makers.

The solar apparatus should be made of brass or other material, such as is suitable for the solar apparatus of other compasses, or for transits and theodolites. The dimensions already given of different parts seem the best for a transit with a main plate of six or seven inches across, but can be varied somewhat. Smaller dimensions would give less exact results, but might be suitable for a light instrument for rough but quick work. Larger dimensions would give greater exactness, and might be used for large transits or theodolites.

The advantages of the new solar instrument are: 1st, the whole of the upper plate is left free for the telescope and its supports and for the common magnetic compass; or, in the case of a plane table, for the drawing-paper and alidade. 2d, the labor of making the instrument is lessened by the arrangement of the horizontal latitude-axis, and this also enables the outer cone of the polar-axis to be the turning one. 3d, the instrument is made simpler and lighter by the way of setting off the latitude with a vernier on the polar-axis, or on a simple arm, or fixed to the main center while the latitude-arc slides past it. 4th, the hollow cone turning around the polar-axis enables the declination-axis to be placed near the latitude-axis, and so makes the solar apparatus more compact, and therefore less exposed to blows and less in the way of other parts of the instrument. 5th, the smaller size and less bulky shape of the declination-arc and its supports also make the solar apparatus more compact. 6th, the declination-arc, set so that its zero-line is parallel to the polar-axis, allows the declination-axis to be put near to the latitude-axis, and therefore more out of the way. 7th, to fix the declination-arc directly to the outer cone of the polar-axis saves material and weight, and makes the declination apparatus simpler, for the arc is then a part of the lens-bar or the whole of it. 9th, the lens-bar, with one prism or mirror to turn the sun's rays at right angles by single reflection, enables the bar to be hung in the middle without danger, even in high latitudes, of its coming to the main center of the instrument until six hours, or nearly that, from the meridian, and not even then if the prism be put at the angle of the right-angled bar and the bar be hung midway between the prism and one end of the bar. 10th, the prism or pair of mirrors to reverse the direction of the sun's rays by double reflection enables the bar to be shortened by one-half. 11th, the two prisms or pairs of mirrors to reverse the direction of the sun's rays twice not only shorten the bar to one-third of the focal length of the lens, but bring the sun's image to the end of the bar opposite to the lens, where it can be easily seen.

Figure 1 is a perspective view of the whole instrument in the general form most recommended. Fig. 2 shows, in section, the latitude-axis with bearings wide apart, and the polar-axis fixed to it with the hollow cone turning outside. Fig. 3 shows, in section, the latitude-axis with bearings wide apart, and the hollow cone fixed to it with the polar-axis turning inside. Fig. 4 shows, in section, the latitude-axis with bearings nearer together, and with a broad shoulder at one of them. Fig. 5 shows, in section, the latitude-axis with bearings close together, and with a broad shoulder at each of them. Fig. 6 shows, in section, the latitude-axis with a single bearing. Fig. 7 shows, in perspective, the polar-axis supported by two braces, as well as by a bearing at its upper end; also, a solar apparatus with a six-inch lens-bar and a declination-arc of forty-seven degrees that has two arms from its ends, one passing through the center of curvature or declination-axis and the other parallel to the equatorial plane, and both meeting six inches from the arc and having a cross-piece at the declination-axis. Fig. 8 shows, in elevation, the instrument with the latitude-arc fixed to the end of the outer cone of the polar-axis; also, a solar apparatus with a six-inch lens-bar and a declination-arc of forty-seven degrees that has two arms for its ends, one to the declination-axis, where it is joined by a cross-piece to the other, which is parallel to the equatorial plane. Fig. 9 shows, in elevation, a solar apparatus with a six-inch lens-bar and a declination-arc of forty-seven degrees with arms from its two ends meeting at the center of curvature; also, the latitude-arc fixed to the main plate and with its vernier supported by an arm from the latitude-axis. Fig. 10 shows, in elevation, a declination apparatus of the kind given in Fig. 9, but joined to the polar-axis by the middle of one of the arms from the ends of the arc. Fig. 11 shows, in elevation, the same kind of declination apparatus, but joined to the polar-axis at the declination-axis with the zero-line in the equatorial plane, and with the six-inch lens-bar turning about the same point and bearing the declination-vernier midway between its two ends. Fig. 12 shows, in elevation, the same kind of declination apparatus, and joined to the polar-axis at the declination-axis, but with the zero-line parallel to the polar-axis and with the six-inch lens-bar joined at right angles to the middle of an arm that bears the declination-vernier. Fig. 13 shows, in elevation, a six-inch lens-bar joined at right angles to the end of such an arm near the declination-vernier, while the arm turns about a point on the polar-axis near the latitude-axis, and the declination-arc of forty-seven degrees is fixed to the outer end of the polar-axis. Fig. 14 shows, in elevation, a six-inch lens-bar joined at less than a right angle to the middle of such an arm. Fig. 15 shows, in elevation, a declination-arc joined by two arms at the declination-axis to the outer end of the polar-axis in such a way that its zero-line is parallel neither to the pole nor to the equator, but with a six-inch lens-bar turning near its middle about the declination-axis, and bearing a vernier-arm that reaches to the declination-arc and marks zero there when the lens-bar is parallel to the equator. Fig. 16 shows, in elevation, a declination-arc joined, in the same way as in Fig. 15, to the polar-axis, and with the vernier-arm turning about the declination-axis in the same way, but joined in its middle to the middle of the lens-bar. Fig. 17 shows, in elevation, a six-inch lens-bar, of which a part is the declination-arc of forty-seven degrees, which is joined by an arm to the declination-axis on the side of the polar-axis near the latitude-axis. Fig. 18 shows, in elevation, a solar apparatus with the declination-axis upon a vernier-arm fixed to the outer end of the turning part of the polar-axis and at right angles with it, and with the six-inch lens-bar made up in part of the arm that joins the declination-arc to the declination-axis. Fig. 19 shows, in perspective, a six-inch lens-bar with its lens and silver-plate. Fig. 20 shows, in perspective, a six-inch lens-bar with a prism at the lens end. Fig. 21 shows, in perspective, a right-angled lens-bar with a prism in the angle, and with the triangular ends of the prism parallel to the polar-axis. Fig. 22 shows, in perspective, a right-angled lens-bar with a prism in the angle, and with the triangular ends of the prism parallel to the equatorial plane. Fig. 23 shows, in perspective, a lens-bar with a prism at the end opposite to the lens. Fig. 24 shows, in perspective, a lens-bar with a prism at each end, and with their triangular ends parallel to the polar-axis. Fig. 25 shows, in perspective, a lens-bar with a prism at each end, and with their triangular ends parallel to the equatorial plane. Fig. 26 shows, in elevation, a declination-arc of forty-seven degrees, which is at the same time the lens-bar with a prism at each end, and joined to the declination-axis near the latitude-axis by an arm, and sliding past a vernier fixed to the outer end of the polar axis. Fig. 27 shows, in elevation, a declination-arc with its zero-line at right angles with the polar-axis, and with its vernier-arm forming a short lens-bar with two prisms.

I claim as my invention—

1. Putting the solar apparatus on the bottom of the lower plate of a transit or compass or theodolite, or on the bottom of a plane-table or other like surveying instrument.

2. Shortening the lens-bar, or that part of it which is parallel to the natural course of the sun's rays, by means of reflection from one or more surfaces of one or more prisms or mirrors fixed to the lens-bar.

BENJ. SMITH LYMAN.

Witnesses:
GERALD ATKINSON,
JOSEPH HUDSON.